United States Patent
Okamoto (10) Patent No.: US 10,113,499 B2
(45) Date of Patent: Oct. 30, 2018

(54) FUEL INJECTION CONTROL DEVICE FOR INTERNAL COMBUSTION ENGINE

(71) Applicant: DENSO CORPORATION, Kariya, Aichi-pref. (JP)

(72) Inventor: Akihiro Okamoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/523,415

(22) PCT Filed: Nov. 2, 2015

(86) PCT No.: PCT/JP2015/005504
§ 371 (c)(1),
(2) Date: May 1, 2017

(87) PCT Pub. No.: WO2016/072084
PCT Pub. Date: May 12, 2016

(65) Prior Publication Data
US 2017/0363036 A1  Dec. 21, 2017

(30) Foreign Application Priority Data
Nov. 5, 2014 (JP) .................................. 2014-225475

(51) Int. Cl.
*F02D 41/38* (2006.01)
*F02D 41/00* (2006.01)
(Continued)

(52) U.S. Cl.
CPC ..... *F02D 41/3809* (2013.01); *F02D 41/0085* (2013.01); *F02D 41/2429* (2013.01);
(Continued)

(58) Field of Classification Search
CPC ...... F02D 41/14; F02D 41/24; F02D 41/2429; F02D 41/38; F02D 41/3809; F02D 2041/389; F02D 2200/0602; F02D 45/00
(Continued)

(56) References Cited

U.S. PATENT DOCUMENTS

2003/0106531 A1\* 6/2003 Saeki .................... F02D 35/023
123/435
2003/0164166 A1\* 9/2003 Takeuchi ............ F02D 41/0085
123/674
(Continued)

FOREIGN PATENT DOCUMENTS

JP 4-203442 7/1992
JP 8-200123 8/1996
(Continued)

OTHER PUBLICATIONS

International Search Report for PCT/JP2015/005504, dated Jan. 19, 2016, 4 pages.

*Primary Examiner* — John Kwon
*Assistant Examiner* — Johnny H Hoang
(74) *Attorney, Agent, or Firm* — Nixon & Vanderhye P.C.

(57) ABSTRACT

An ECU has a fuel pressure sensor that detects fuel pressure inside of a common rail. The ECU detects the fuel pressure at a predetermined frequency and calculates a drop amount of the fuel pressure in accordance with fuel injection by fuel injectors based on the detected fuel pressure. The ECU acquires a fluctuation amount of a fuel injection amount of each of the fuel injectors based on the drop amount of the fuel pressure and learns an injection characteristic of each of the fuel injectors, the injection characteristic indicating a correlation between the fuel injection amount and the fluctuation amount of the fuel injection. In a case in which a detection timing of the fuel pressure is within a fuel injection period of a predetermined fuel injector, the ECU disallows the learning of the injection characteristic using the fuel pressure detected in the fuel injection period.

4 Claims, 7 Drawing Sheets

(51) Int. Cl.
*F02D 41/24* (2006.01)
*F02D 41/40* (2006.01)

(52) U.S. Cl.
CPC ..... *F02D 41/2448* (2013.01); *F02D 41/2467* (2013.01); *F02D 41/3863* (2013.01); *F02D 41/402* (2013.01); *F02D 2041/389* (2013.01); *F02D 2200/0602* (2013.01); *F02D 2200/0616* (2013.01); *F02D 2250/04* (2013.01); *H05K 999/99* (2013.01); *Y02T 10/44* (2013.01)

(58) Field of Classification Search
USPC ....... 123/295–299, 445, 447, 478, 480, 486, 123/494, 674; 701/102–105
See application file for complete search history.

(56) References Cited

U.S. PATENT DOCUMENTS

| | | | |
|---|---|---|---|
| 2007/0163543 | A1 | 7/2007 | Dietl et al. |
| 2008/0060617 | A1* | 3/2008 | Adachi ................ F02D 31/007 123/447 |
| 2009/0055084 | A1 | 2/2009 | Ishizuka et al. |
| 2009/0326788 | A1* | 12/2009 | Yuasa ................ F02D 41/3809 701/104 |
| 2010/0307457 | A1 | 12/2010 | Sugiyama et al. |
| 2014/0224220 | A1* | 8/2014 | Moonjelly ............... F02D 1/06 123/447 |

FOREIGN PATENT DOCUMENTS

| | | |
|---|---|---|
| JP | 9-189255 | 7/1997 |
| JP | 9-317583 | 12/1997 |
| JP | 10-9033 | 1/1998 |
| JP | 2010-43614 | 2/2010 |

* cited by examiner

FUEL INJECTION CONTROL DEVICE FOR INTERNAL COMBUSTION ENGINE

CROSS REFERENCE TO RELATED APPLICATION

This application is the U.S. national phase of International Application No. PCT/JP2015/005504 flied Nov. 2, 2015, which designated the U.S. and claims priority to Japanese Patent Application No. 2014-225475 filed on Nov. 5, 2014, the entire contents of each of which are incorporated herein by reference.

TECHNICAL FIELD

The present disclosure relates to a fuel injection control device for an internal combustion engine.

BACKGROUND ART

Conventionally, in a fuel injection control device for an internal combustion engine, a fuel pressure sensor that detects fuel pressure inside of a fuel supply passage is disposed, and an injection characteristic of a fuel injector is learned based on the fuel pressure detected by the fuel pressure sensor. For example, Patent Literature 1 discloses such kind of fuel injection control device.

The fuel injection control device disclosed in Patent Literature 1 has correction parameters corresponding to cylinders respectively and determines a fuel injection amount of each cylinder by multiplying a basic fuel injection amount set in advance by each of the correction parameters of the cylinders. The fuel injection control device learns the correction parameter of each cylinder based on the fuel pressure detected by the fuel pressure sensor. Specifically, the fuel injection control device detects the fuel pressure by the fuel pressure sensor at each 180° CA (Crank Angle). The fuel injection control device calculates a drop amount of the fuel pressure in accordance with a fuel injection from the fuel pressure detected by the fuel pressure sensor in each cylinder and learns the correction parameter based on the drop amount of the fuel pressure calculated in each cylinder.

In recent years, in the internal combustion engine, so-called divided injection in which a fuel injection is divided into a plurality of times of fuel injection is performed in order to reduce emissions or improve fuel consumption. In a case in which the divided injection is performed by the fuel injection control device disclosed in Patent Literature 1, for example, when a time period from a start to an end of the divided injection becomes longer than 180° CA, the fuel pressure may be detected by the fuel pressure sensor during the fuel injection of the fuel injector. When the fuel pressure is detected during the fuel injection, it is impossible to appropriately detect the drop amount of the fuel pressure in accordance with the fuel injection, and therefore the learning described above may not be performed appropriately.

PRIOR ART LITERATURE

Patent Literature

Patent Literature 1: JP H04-203442 A

SUMMARY OF INVENTION

An object of the present disclosure is to provide a fuel injection control device for an internal combustion engine capable of learning a fuel injection characteristic of a fuel injector with high accuracy.

According to one aspect of the present disclosure, a fuel injection control device for an internal combustion engine having a plurality of cylinders and a plurality of fuel injectors, each of the fuel injectors performing a divided injection to each cylinder, includes a fuel pressure sensor that detects fuel pressure inside of an accumulator that supplies accumulated fuel to each of the plurality of fuel injectors. The fuel injection control device detects the fuel pressure at a predetermined frequency and calculates a drop amount of the fuel pressure in accordance with fuel injection based on the detected fuel pressure. The fuel injection control device acquires a fluctuation amount of a fuel injection amount of each of the fuel injectors based on the drop amount of the fuel pressure and learns an injection characteristic of each of the fuel injectors that indicates a correlation between the fuel injection amount and the fluctuation amount of the fuel injection. The fuel injection control device calculates a correction parameter for correcting the fuel injection amount of each of the fuel injectors based on the injection characteristic of each of the fuel injectors. In a case in which a detection timing of the fuel pressure is within a fuel injection period of a predetermined fuel injector among the plurality of fuel injectors, the fuel injection control device disallows the learning of the injection characteristic using the fuel pressure detected within the fuel injection period.

According to such a configuration, since the learning of the injection characteristic is disallowed when the fuel pressure is detected within the fuel injection period of the fuel injector, the learning of the injection characteristic based on inappropriate fuel pressure drop amount is hardly performed. Thus, the learning of the injection characteristic of the fuel injector can be executed with high accuracy.

According to the present disclosure, the learning of the injection characteristic of the fuel injector can be executed with high accuracy.

BRIEF DESCRIPTION OF DRAWINGS

The above and other objects, features and advantages of the present disclosure will become more apparent from the following detailed description made with reference to the accompanying drawings. In the drawings.

EMBODIMENT FOR CARRYING OUT INVENTION

Hereinafter, one embodiment of a fuel injection control device for an internal combustion engine is described.

Figure 1:
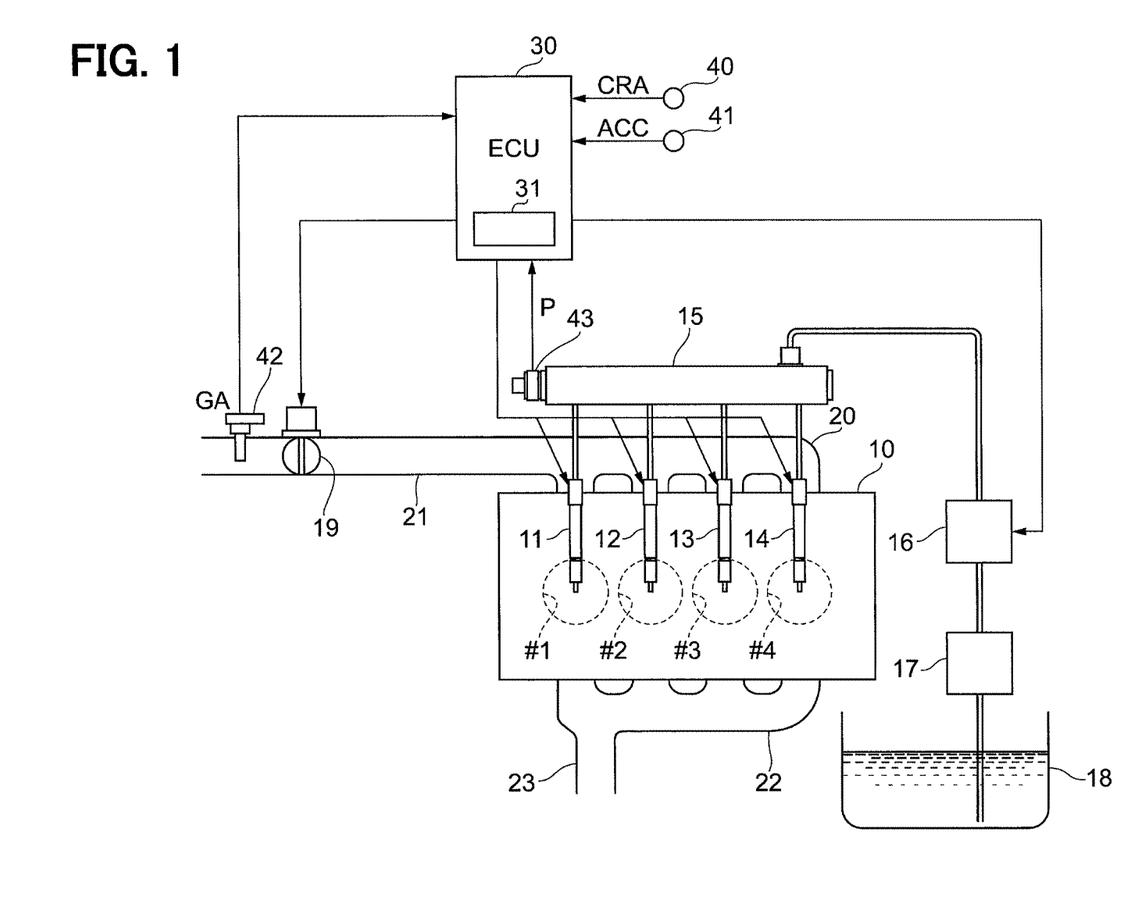
FIG. 1 is a block diagram showing a schematic whole configuration of a fuel injection control device for an internal combustion engine according to one embodiment.

As shown in FIG. 1, an internal combustion engine 10 according to the present embodiment has a plurality of cylinders #1, #2, #3, #4 and a plurality of fuel injectors 11, 12, 13, 14. The fuel injectors 11 to 14 are disposed so as to correspond to the cylinders #1 to #4. The fuel injectors 11 to 14 are connected to a common rail 15 that is an accumulator. The common rail 15 is connected to a fuel tank 18 via a high pressure pump 16 and a feeding pump 17. The feeding pump 17 supplies fuel to the high pressure pump 16 by suctioning the fuel stored in the fuel tank 18. The high pressure pump 16 pressurizes the fuel supplied from the feeding pump 17 and feeds the pressurized fuel to the common rail 15. With this, high pressure fuel is stored in the common rail 15. The fuel injectors 11 to 14 inject the high pressure fuel in the common rail 15 directly to combustion chambers of the cylinders #1 to #4 respectively by means of opening and closing operation of the fuel injectors.

Each of the cylinders #1 to #4 of the internal combustion engine 10 is connected to an intake passage 21 via an intake manifold 20. The intake manifold 20 and the intake passage 21 introduce air of the outside (outer air) to each of the cylinders #1 to #4. The internal combustion engine 10 has a throttle valve 19 that changes a passage sectional area of the intake passage 21. The throttle valve 19 adjusts an air quantity (intake air quantity) passed through the intake passage 21 by means of opening and closing operation of the throttle valve 19.

Each of the cylinders #1 to #4 of the internal combustion engine 10 is connected to an exhaust passage 23 via an exhaust manifold 22. The exhaust manifold 22 and the exhaust passage 23 discharge gas (exhaust gas) combusted in the combustion chambers of each of the cylinders #1 to #4 to the outside.

The internal combustion engine 10 has, for example, a crank angle sensor 40, an accelerator sensor 41, an air flow meter 42, and a fuel pressure sensor 43 as various sensors for detecting a state of the internal combustion engine 10 or a state of a vehicle. The crank angle sensor 40 detects a rotation angle (crank angle) CRA of a crank shaft of the internal combustion engine 10. The accelerator sensor 41 detects an operation amount (accelerator operation amount) ACC of an accelerator pedal by a driver. The air flow meter 42 detects an air quantity (intake air quantity) GA passed through the intake passage 21. The fuel pressure sensor 43 detects fuel pressure P inside of the common rail 15.

The internal combustion engine 10 has an electric control unit (ECU) 30 that controls driving of the internal combustion engine 10. The ECU 30 is mainly provided with a microcomputer and has a memory 31 and the like. The ECU 30 acquires each information with respect to the crank angle CRA, the accelerator operation amount ACC, the intake air quantity GA, and the fuel pressure P by receiving the output of respective sensors 40 to 43. Further, the ECU 30 acquires a rotation speed (engine speed) NE of the crank shaft based on time series data of the crank angle CRA. The ECU 30 executes fuel injection control, intake air quantity control or the like based on the acquired data. The fuel injection control that controls the fuel amount to be injected to respective cylinders #1 to #4 is executed by opening and closing the fuel injectors 11 to 14. The intake air quantity control that controls the intake air quantity GA is executed by opening and closing the throttle valve 19. Further, the ECU 30 controls fuel supply to the common rail 15 and the interruption of the fuel supply to the common rail 15 by controlling driving of the high pressure pump 16. In this way, the ECU 30 corresponds to a fuel injection control device according to the present embodiment.

Next, the fuel injection control executed by the ECU 30 is described in detail.

The ECU 30 sets a basic fuel injection amount Qb, which is a basic value of the fuel injection amount to be injected to respective cylinders #1 to #4 in one combustion cycle, based on an engine parameter such as the engine rotation speed NE, the accelerator operation amount ACC, the intake air quantity GA or the like corresponding to a driving state of the internal combustion engine 10. The ECU 30 calculates each of fuel injection amounts Q(1) to Q(4) corresponding to the fuel injectors 11 to 14 respectively by multiplying the basic fuel injection amount Qb by each of correction parameters K(1) to K(4) of fuel injectors 11 to 14. The correction parameters K(1) to K(4) are provided to correct fluctuation of the fuel injection amount of respective fuel injectors 11 to 14. Hereinafter, each of the fuel injection amount of the fuel injectors 11 to 14 is represented by "Q(i)", and each of the correction parameter of the fuel injectors 11 to 14 is represented by "K(i)" (i=1 to 4).

The ECU 30 executes the divided injection in which each of two amounts into which the calculated fuel injection amount Q(i) is divided is injected from the fuel injectors 11 to 14 during a time period between an intake stroke and a compression stroke. Specifically, the ECU 30 divides the fuel injection amount Q(i) into a first fuel injection amount Q1($i$) and a second fuel injection amount Q2($i$). Here, a relationship of "Q(i)=Q1($i$)+Q2($i$)" is satisfied by the fuel injection amount Q(i), the first fuel injection amount Q1($i$), and the second fuel injection amount Q2($i$). The first fuel injection amount Q1($i$) and the second fuel injection amount Q2($i$) may be the same amount. Alternatively, the first fuel injection amount Q1($i$) and the second fuel injection amount Q2($i$) may be different amount from each other.

Figure 2:
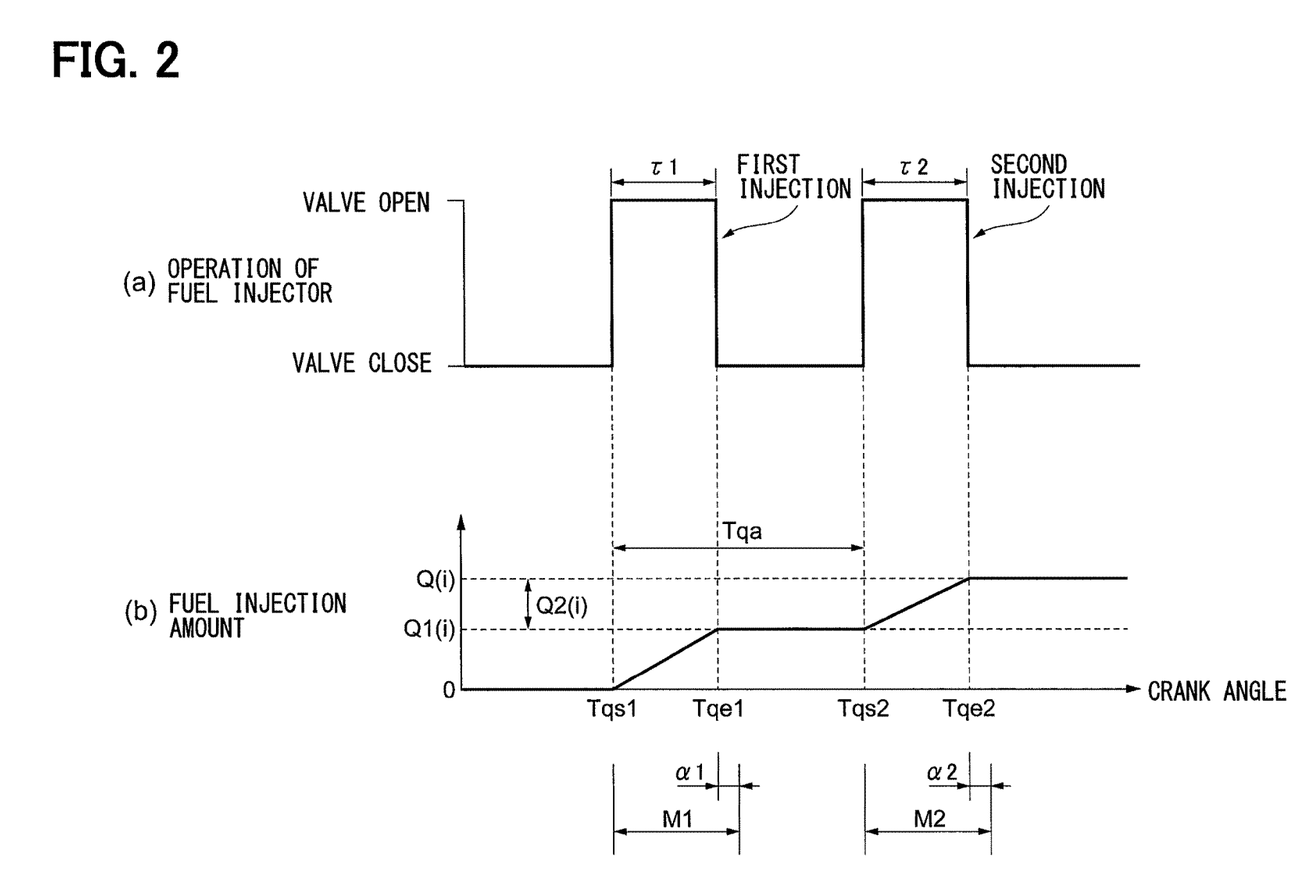
FIG. 2 is a timing chart showing a relationship between driving of a fuel injector and a fuel injection amount of the fuel injection control device according to the present embodiment.

As shown in FIG. 2, for example, the ECU 30 sets a first fuel injection time $\tau$1 that indicates an injecting duration for a first time, and a second fuel injection time $\tau$2 that indicates an injecting duration for a second time based on each of the fuel injection amounts Q1($i$), Q2($i$) and the fuel pressure P.

The ECU 30 sets a timing when a first fuel injection is started (first fuel injection start timing) Tqs1 based on the engine parameter such as the engine rotation speed NE or the like. The first fuel injection start timing Tqs1 is set by the unit of the crank angle. The first fuel injection start timing is set within the intake stroke. A finish timing Tqe1 of the first fuel injection is set to the timing when the first fuel injection time $\tau$1 is passed since the first fuel injection start timing Tqs1.

The ECU 30 sets a timing when a second fuel injection is started (second fuel injection start timing) Tq2 to be delayed from the first fuel injection start timing Tqs1 by a predetermined crank angle Tqa. The second fuel injection start timing Tqs2 is set within the time period between the intake stroke and the compression stroke. Further, the second fuel injection start timing Tqs2 may be set based on the engine parameter such as the engine rotation speed NE or the like, similar to the first fuel injection start timing Tqs1. A finish timing Tqe2 of the second fuel injection is set to the timing when the second fuel injection time $\tau$2 is passed since the second fuel injection start timing Tqs2.

Figure 3:
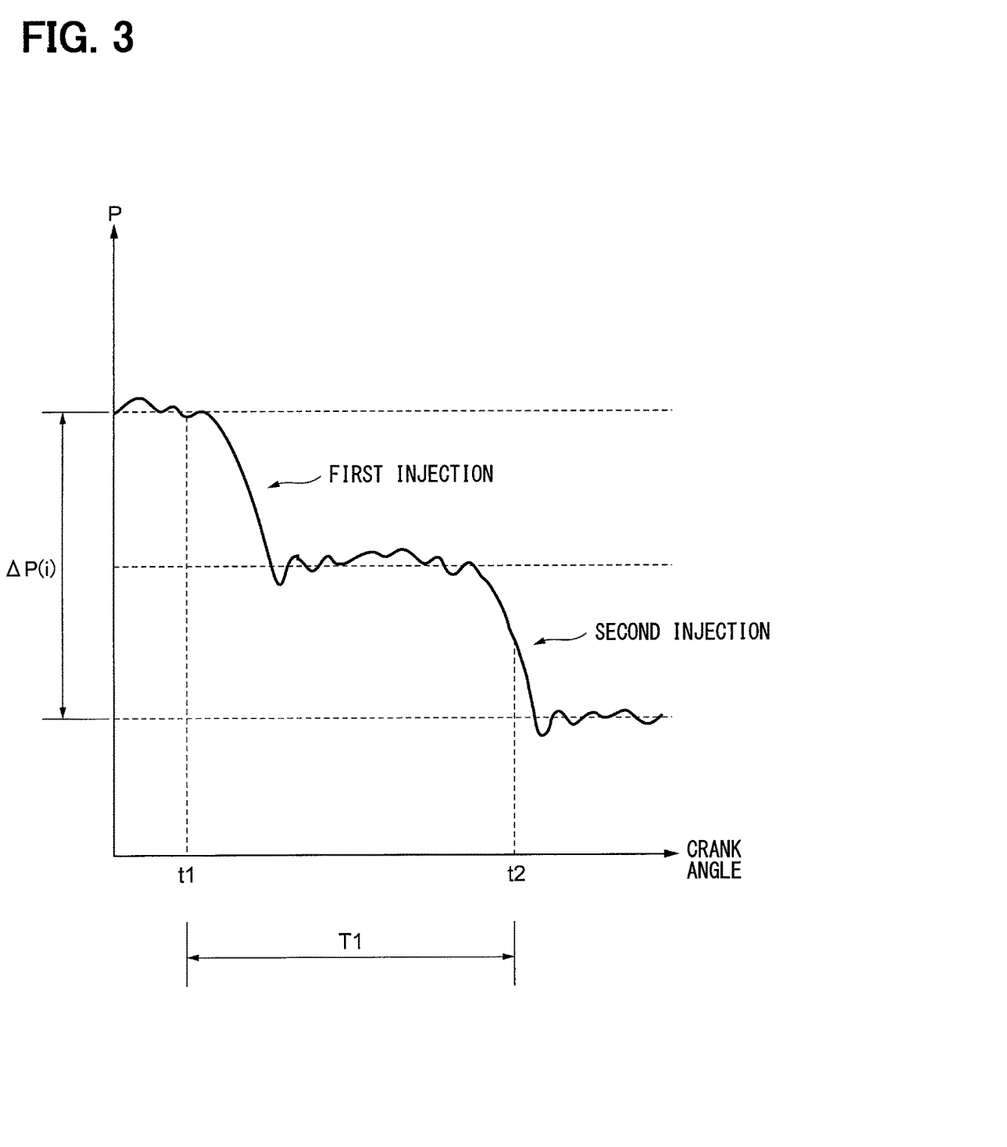
FIG. 3 is a graph showing a relationship between a crank angle and fuel pressure P of the fuel injection control device according to the present embodiment.

On the other hand, as shown in FIG. 3, when one of the fuel injectors 11 to 14 performs the first injection and the second injection of the divided injection in this order, the fuel pressure P in the common rail 15 is decreased as the fuel injection is performed. At this time, there is a correlation between the fuel amount Q(i) injected by each of the fuel injectors 11 to 14 and a drop amount ΔP(i) of the fuel pressure P. Thus, a fluctuation amount ΔQ(i) of the fuel injection amount of each of the fuel injectors 11 to 14 can be calculated by the fuel pressure drop amount ΔP(i) when the fuel is injected from each of the fuel injectors 11 to 14. By using this, the ECU 30 successively calculates the fuel pressure drop amount ΔP(i) in accordance with the fuel injection based on the fuel pressure P detected by the fuel pressure sensor 43, and calculates the fuel injection fluctuation amount ΔQ(i) of each of the fuel injectors 11 to 14 based on the calculated fuel pressure drop amount ΔP(i).

Here, the fuel injection fluctuation amount ΔQ(i) according to the present embodiment denotes a ratio of the fuel injection amount of each of the fuel injectors 11 to 14 against an average amount of the injection amount of each of the fuel injectors 11 to 14. Namely, in a case in which the fuel injection fluctuation amount ΔQ(i) of a certain fuel injector is equal to "1", it can be determined that the fuel injection amount of the certain fuel injector is not shifted from the average amount. Further, in a case in which the fuel injection fluctuation amount ΔQ(i) of a certain fuel injector is more than "1", it can be determined the fuel injection amount of the certain fuel injector is fluctuated in a range at a side larger than the average amount. Further, in a case in which the fuel injection fluctuation amount ΔQ(i) of a certain fuel injector is less than "1", it can be determined the fuel injection amount of the certain fuel injector is fluctuated in a range at a side smaller than the average amount.

Figure 4:
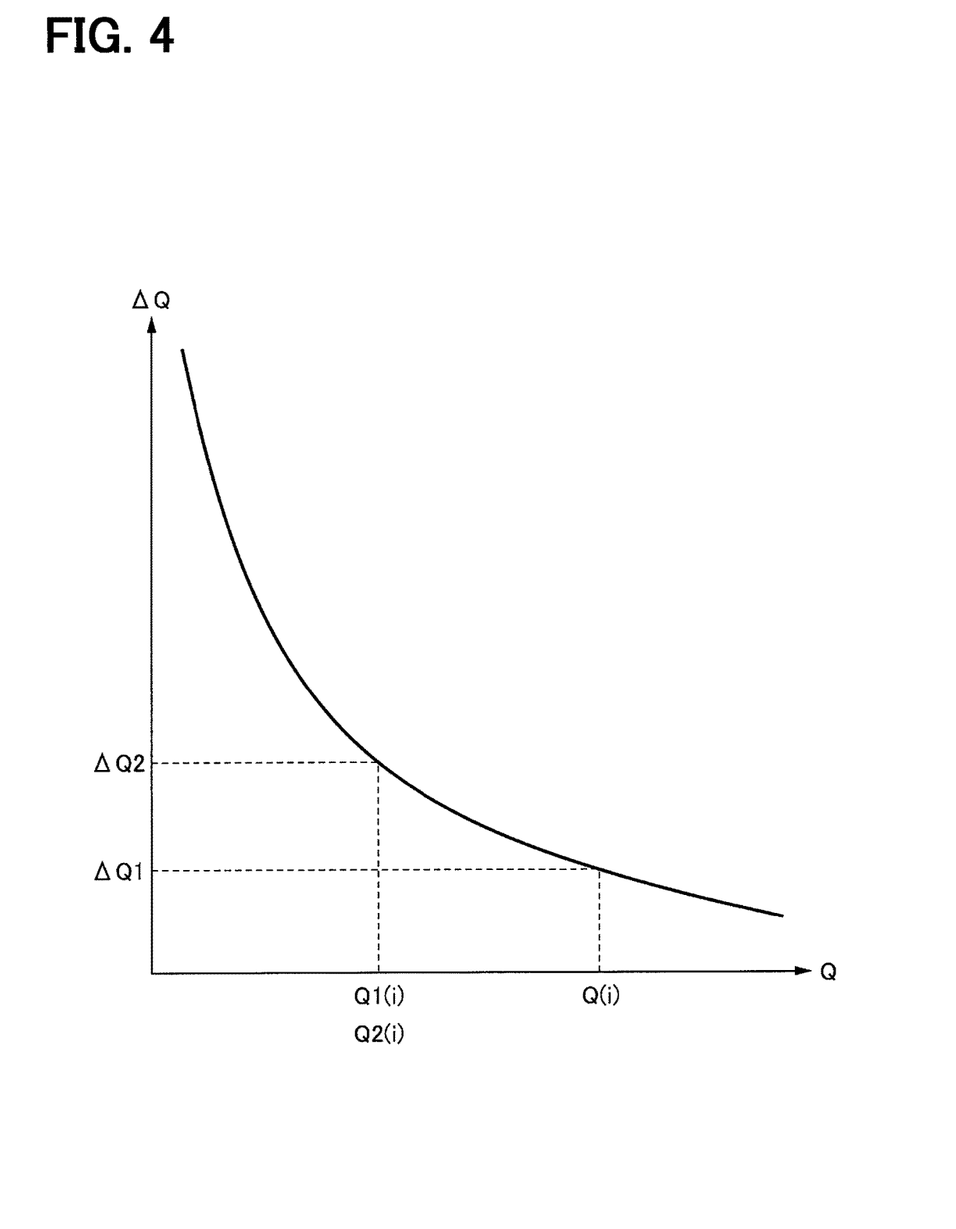
FIG. 4 is a graph showing a relationship between the fuel injection amount of the fuel injector and a fuel injection fluctuation amount of the fuel injection control device according to the present embodiment.

The ECU 30 learns, for example, a relationship between the fuel injection fluctuation amount ΔQ(i) and the actual fuel injection amount Q(i) shown in FIG. 4 by successively calculating the fuel pressure drop amount ΔP(i). Hereinafter, the relationship between the fuel injection fluctuation amount ΔQ(i) and the fuel injection amount Q(i) is called an injection characteristic. The ECU 30 has a learning result of the injection characteristic of each of the fuel injectors 11 to 14. The ECU 30 sets the correction parameter K(i) against the fuel injection amount Q(i) at each time based on the learning result of the injection characteristic of each of the fuel injectors 11 to 14.

Next, a learning method of the injection characteristic of the each of the fuel injectors 11 to 14 will be described in detail.

The ECU 30 detects the fuel pressure P inside of the common rail 15 detected by the fuel pressure sensor 43 at a predetermined frequency T. The predetermined frequency T is set to, for example, an interval of a compression top dead center (TDC) of each of the cylinders #1 to #4, namely an interval of 180° CA (Crank Angle). In this way, by detecting the fuel pressure P at the predetermined frequency T, an operation load of the ECU 30 can be reduced, however the following problem arises.

In a case in which the divided injection is performed by the fuel injectors 11 to 14, as shown in for example FIG. 3, after the ECU 30 detects the fuel pressure P at time t1, when the ECU 30 detects the fuel pressure P at time t2 at which the frequency T is passed since the time t1, the fuel pressure P might be detected during a period during which the fuel injection from the fuel injectors 11 to 14 has been performing. In this case, since the fuel pressure drop amount ΔP(i) in accordance with the fuel injection cannot be detected appropriately, the injection characteristic cannot be learned appropriately.

Thus, in a case in which a detection timing of the fuel pressure P is in a fuel injection period of the fuel injectors 11 to 14, the ECU 30 disallows the learning of the injection characteristic using the fuel pressure P detected in the fuel injection period.

Further, when the divided injection shown in FIG. 3 is performed, the ECU 30 might erroneously learn the fuel injection fluctuation amount ΔQ(i). The reason is as described below.

In a case in which the fuel injectors 11 to 14 have the injection characteristic shown in FIG. 4, the fuel injection fluctuation amount ΔQ when the fuel injection amount Q(i) is injected in one time from the fuel injectors 11 to 14 is different from the fuel injection fluctuation amount ΔQ when the fuel injection amount Q(i) is injected by dividing into the first fuel injection amount Q1(i) and the second fuel injection amount Q2(i). Namely, the fuel injection fluctuation amount ΔQ when the fuel injection amount Q(i) is injected in one time is equal to ΔQ1, while the fuel injection fluctuation amount ΔQ when the fuel injection amount Q(i) is divided and injected is equal to ΔQ2 larger than ΔQ1. Here, in FIG. 4, it is shown as an example that the first fuel injection amount Q1(i) and the second fuel injection amount Q2(i) are set to be the same amount.

Figure 5:
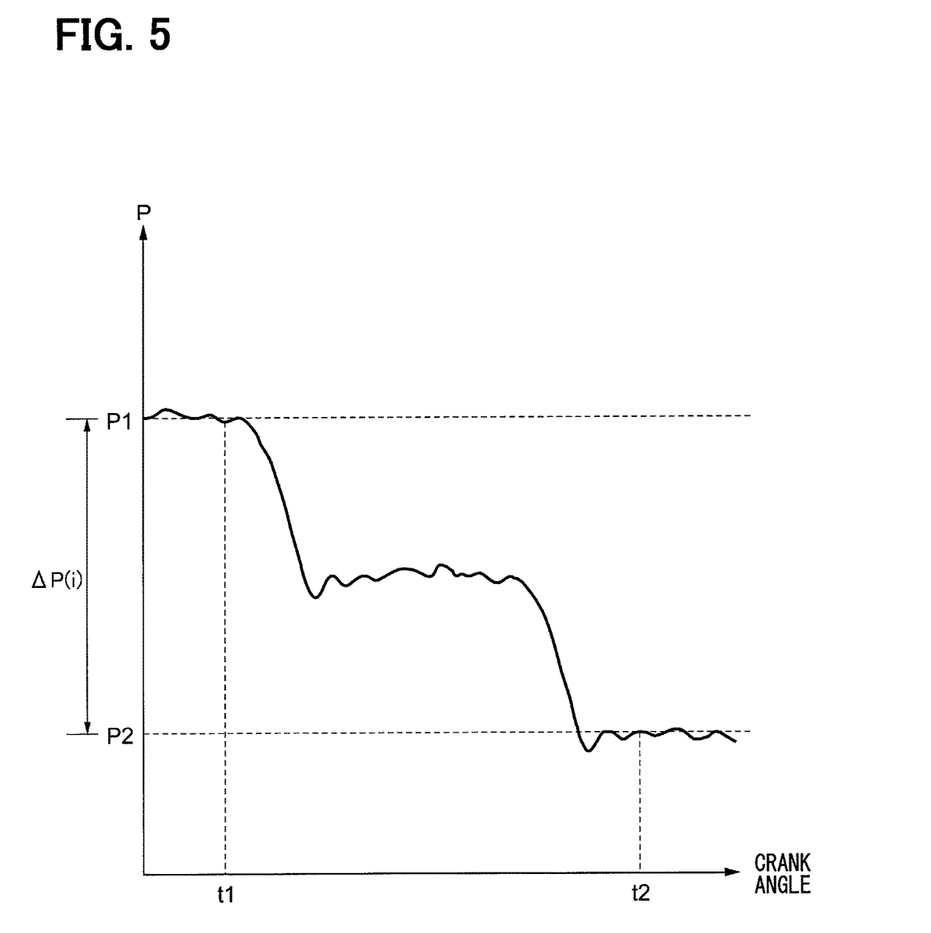
FIG. 5 is a graph showing a relationship between the crank angle and the fuel pressure P of the fuel injection control device according to the present embodiment.

On the other hand, as shown in FIG. 5, in a case in which the ECU 30 detects the fuel pressure P1 at a first timing t1 before the first fuel injection and detects the fuel pressure P2 at a second timing t2 after the second fuel injection, the fuel pressure drop amount ΔP(i) (=P1−P2) calculated from P1 and P2 is equal to a value corresponding to the fuel injection amount Q(i). However, the fuel injection fluctuation amount ΔQ(i) calculated based on the fuel pressure drop amount ΔP(i) is equal not to ΔQ1 corresponding to the fuel injection amount Q(i) shown in FIG. 4 but to ΔQ2 corresponding to the first fuel injection amount Q1(i) and the second fuel injection amount Q2(i). In such a case, if the ECU 30 learns the fuel injection fluctuation amount ΔQ(i) by associating the fuel injection fluctuation amount ΔQ(i) calculated based on the fuel pressure drop amount ΔP(i) with the fuel injection amount Q(i), since the actual fuel injection fluctuation amount ΔQ(i) is equal to the value corresponding to the first fuel injection amount Q1(i) and the second fuel injection amount Q2(i), erroneous learning might be occurred.

Thus, the ECU 30 learns the injection characteristic by changing the fuel injection amount Q(i) associated with the fuel injection fluctuation amount ΔQ(i) based on the correlation between (1) the fuel injection timing of the fuel injectors 11 to 14 and (2) a first detection timing t1 and a second detection timing t2.

Next, specific processing of the fuel injection control executed by the ECU 30 based on such a learning method will be described with reference to FIG. 6 and FIG. 7. Here, the ECU 30 executes the processing shown in FIG. 6 and FIG. 7 repeatedly at a predetermined frequency during stopping of the high pressure pump 16 after the fuel pressure-feeding to the common rail 15 by the high pressure pump 16 is stopped.

Firstly, the ECU 30 detects the present fuel pressure $P_m$ by means of the fuel pressure sensor 43 (Step S1), and determines whether the fuel injection fluctuation amount ΔQ(i) can be calculated (Step S2). For example, the ECU 30 determines that the fuel injection fluctuation amount ΔQ(i) can be calculated (Step S2: YES) when the fuel pressure P detected by the fuel pressure sensor 43 is more than a predetermined pressure and the engine speed NE is more than a predetermined speed. Further, in order to determine whether the fuel injection fluctuation amount ΔQ(i) can be calculated, the predetermined pressure and the predetermined speed are set in advance based on an experiment or the like. When a positive determination is made in the processing of Step S2 (Step S2: YES), the ECU 30 executes the learning processing of the fuel injection of the fuel injectors 11 to 14 shown in FIG. 7 (Step S3).

Namely, the ECU 30 determines whether at least one of a detection timing of the preceding fuel pressure $P_{m-1}$ and a detection timing of the present fuel pressure $P_m$ is within fuel injection periods M1, M2 of the fuel injectors 11 to 14 (Step S30). Specifically, as shown in FIG. 2, the ECU 30 sets a time period between the first fuel injection start timing Tqs1 and the timing of "Tqe1+α1" in which the first fuel injection finish timing Tqe1 is added by a predetermined time α1 as a first fuel injection period M1. Further, the ECU 30 sets a time period between the second fuel injection start timing Tqs2 and the timing of "Tqe2+α2" in which the second fuel injection finish timing Tqe2 is added by a predetermined time α2 as a second fuel injection period M2. In this way, in the present embodiment, the first fuel injection period M1 and the second fuel injection period M2 are set to be longer than the actual fuel injection time. This configuration excludes the fuel pressure P detected during a transient fluctuation period of the fuel pressure after the fuel injection in order to detect the fuel pressure drop amount $\Delta P(i)$ in accordance with the fuel injection with high accuracy. The predetermined times α1, α2 are set in advance based on an experiment or the like so as to enhance the detection accuracy of the fuel pressure drop amount $\Delta P(i)$.

Figure 7:
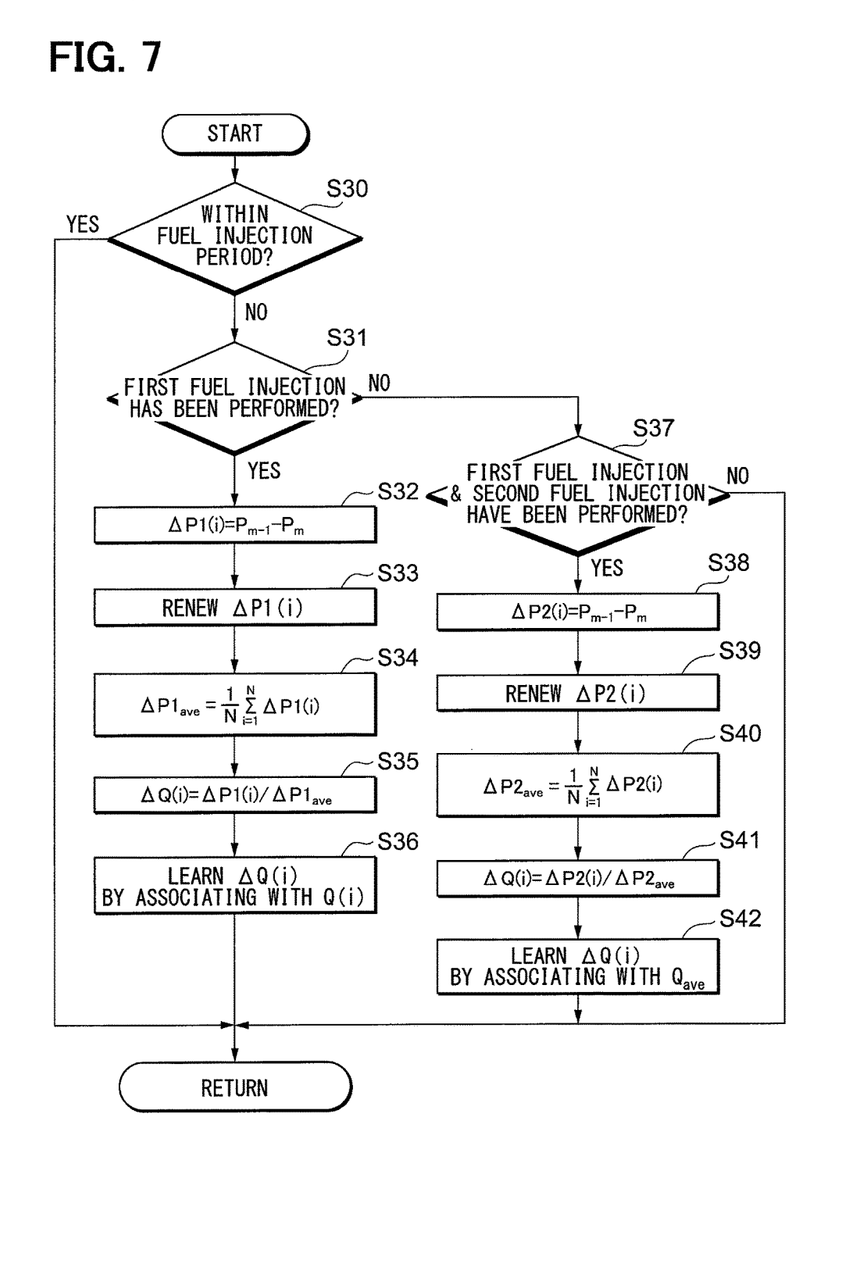
FIG. 7 is a flowchart showing learning of an injection characteristic of the fuel injector executed by the fuel injection control device according to the present embodiment.

As shown in FIG. 7, when the positive determination is made in the processing of Step S30 (Step S30: YES), the ECU 30 determines whether the first fuel injection in the divided injection has been performed by a predetermined fuel injector within a time period between the detection timing of the preceding fuel pressure $P_{m-1}$ and the detection timing of the present fuel pressure $P_m$ (Step S31). Here, the predetermined fuel injector means one of the fuel injectors 11 to 14. The ECU 30 executes the processing of Step S31 based on the timing of the divided injection of all of the fuel injectors 11 to 14. Here, in the present embodiment, the detection timing of the preceding fuel pressure $P_{m-1}$ corresponds to a first timing, and the detection timing of the present fuel pressure $P_m$ corresponds to a second timing.

Specifically, when the detection timing of the preceding fuel pressure $P_{m-1}$ is before the first fuel injection start timing Tqs1 of the predetermined fuel injector and the detecting timing of the present fuel pressure $P_m$ is within the time period after the first fuel injection period M1 of the predetermined fuel injector before the second fuel injection start timing Tqs2, the ECU 30 makes a positive determination in the processing of Step S31 (Step S31: YES). In this case, the ECU 30 calculates the first fuel pressure drop amount $\Delta P1(i)$ of the predetermined fuel injector based on the difference between the detected present fuel pressure $P_m$ and the detected preceding fuel pressure $P_{m-1}$ (Step S32). The first fuel pressure drop amount $\Delta P1(i)$ is associated with the first fuel injection amount $Q1(i)$ of the predetermined fuel injector.

Next, the ECU 30 renews the first fuel pressure drop amount $\Delta P1(i)$ of the predetermined fuel injector stored in the memory 31 based on the calculated first fuel pressure drop amount $\Delta P1(i)$ of the predetermined fuel injector (Step S33). By repeatedly executing the processing of Steps S32 and S33 by the ECU 30, each of the first fuel pressure drop amounts $\Delta P1(1)$ to $\Delta P1(4)$ of the fuel injectors 11 to 14 is stored in the memory 31. Further, the ECU 30 calculates a first average value $\Delta P1_{ave}$ of the fuel pressure drop amount from the first fuel pressure drop amounts $\Delta P1(1)$ to $\Delta P1(4)$ stored in the memory 31 based on the following expression f1 (Step S34).

$$\Delta P1_{ave} = \frac{1}{N}\sum_{i=1}^{N}\Delta P1(i) \qquad (\text{f 1})$$

Here, N denotes a number of the fuel injectors. Accordingly, "N=4" in the present embodiment.

Next, the ECU 30 calculates the fuel injection fluctuation amount $\Delta Q(i)$ from the calculated first average value $\Delta P1_{ave}$ of the fuel pressure drop amount and the first fuel pressure drop amount $\Delta P1(i)$ calculated in Step S32 based on the following expression f2 (Step S35).

$$\Delta Q(i) = \frac{\Delta P1(i)}{\Delta P1_{ave}} \qquad (\text{f 2})$$

Further, the ECU 30 learns the calculated fuel injection fluctuation amount $\Delta Q(i)$ as the injection characteristic of the predetermined fuel injector by associating with the first fuel injection amount $Q1(i)$ (Step S36).

On the other hand, when a negative determination is made in Step S31 (Step S31: NO), the ECU 30 determines whether both of the first fuel injection and the second fuel injection in the divided injection have been performed by the predetermined fuel injector within the time period between the detection timing of the preceding fuel pressure $P_{m-1}$ and the detection timing of the present fuel pressure $P_m$ (Step S37).

Specifically, when the detection timing of the preceding fuel pressure $P_{m-1}$ is before the first fuel injection start timing Tqs1 of the predetermined fuel injector and the detecting timing of the present fuel pressure $P_m$ is after the second fuel injection period M2 of the predetermined fuel injector is passed, the ECU 30 makes a positive determination in the processing of Step S37 (Step S37: YES). In this case, the ECU 30 calculates the second fuel pressure drop amount $\Delta P2(i)$ of the predetermined fuel injector based on the difference between the detected present fuel pressure $P_m$ and the detected preceding fuel pressure $P_{m-1}$ (Step S38). The second fuel pressure drop amount $\Delta P2(i)$ is associated with the fuel injection amount $Q(i)$ of two injections in the divided injection of the predetermined fuel injector.

Next, the ECU 30 renews the second fuel pressure drop amount $\Delta P2(i)$ of the predetermined fuel injector stored in the memory 31 based on the calculated second fuel pressure drop amount $\Delta P2(i)$ of the predetermined fuel injector (Step S39). By repeatedly executing the processing of Steps S38 and S39 by the ECU 30, each of the second fuel pressure drop amounts $\Delta P2(1)$ to $\Delta P2(4)$ of the fuel injectors 11 to 14 is stored in the memory 31. Further, the ECU 30 calculates a second average value $\Delta P2_{ave}$ of the fuel pressure drop amount from the second fuel pressure drop amounts $\Delta P2(1)$ to $\Delta P2(4)$ stored in the memory 31 based on the following expression f3 (Step S40).

$$\Delta P2_{ave} = \frac{1}{N}\sum_{i=1}^{N}\Delta P2(i) \qquad (\text{f 3})$$

Next, the ECU 30 calculates the fuel injection fluctuation amount $\Delta Q(i)$ from the calculated second average value $\Delta P2_{ave}$ of the fuel pressure drop amount and the second fuel pressure drop amount $\Delta P2(i)$ calculated in Step S38 based on the following expression f4 (Step S41).

$$\Delta Q(i) = \frac{\Delta P2(i)}{\Delta P2_{ave}} \quad (f\ 4)$$

Further, the ECU 30 learns the calculated fuel injection fluctuation amount $\Delta Q(i)$ as the injection characteristic of the predetermined fuel injector by associating with an average value $Q_{ave}$ of the first fuel injection amount $Q1(i)$ and the second fuel injection amount $Q2(i)$ (Step S42).

When a negative determination is made in the processing of Step S30 (Step S30: NO) or when a negative determination is made in the processing of Step S37 (Step S37: NO), the ECU 30 finished the series of the processing.

The ECU 30 learns each of the injection characteristic of the fuel injectors 11 to 14 by repeatedly executing the processing shown in FIG. 7.

Figure 6:
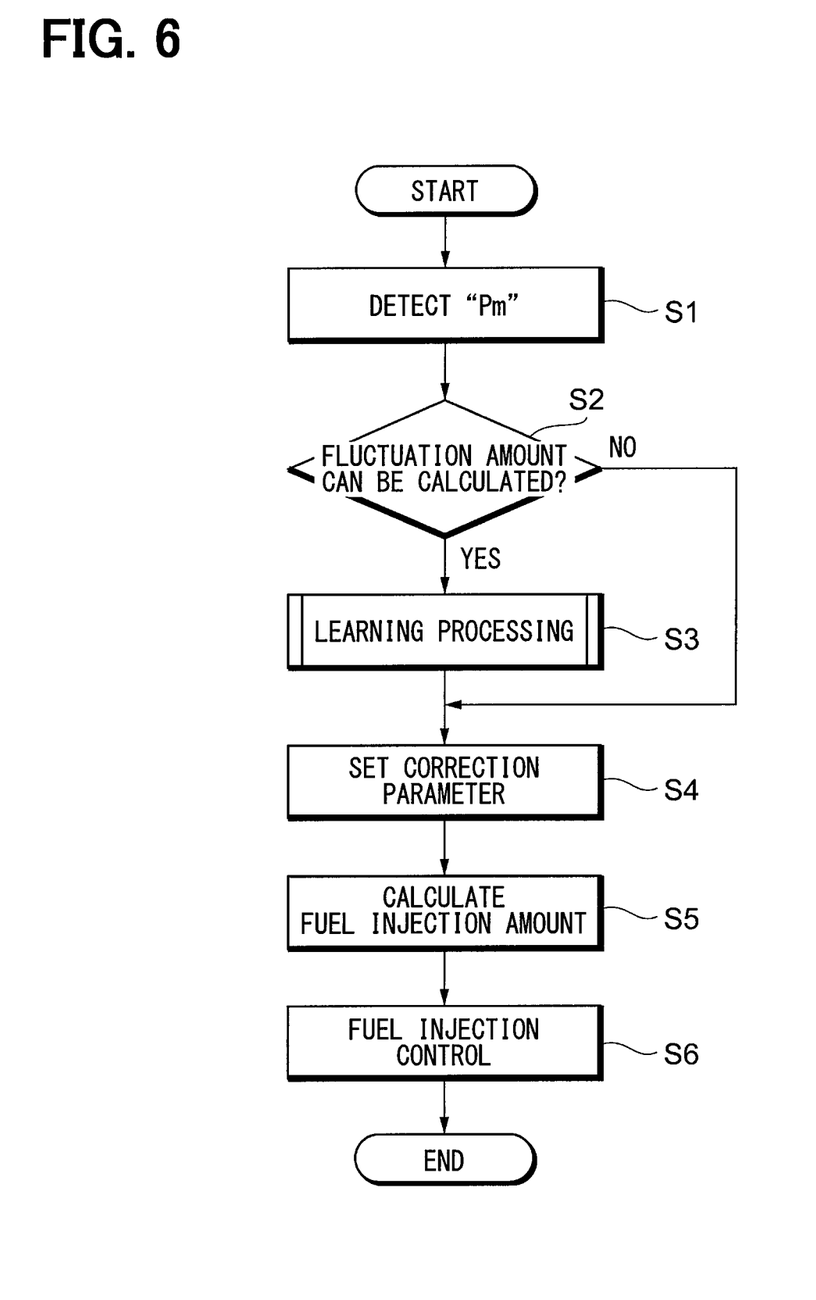
FIG. 6 is a flowchart showing processing of fuel injection control executed by the fuel injection control device according to the present embodiment.

As shown in FIG. 6, after the calculation processing shown in FIG. 5 is finished or in a case in which the negative determination is made in the processing of Step S2 (Step S2: NO), the ECU 30 sets the correction parameter K(i) of each of the fuel injectors 11 to 14 (Step S4). Specifically, based on the learning result of the injection characteristic of each of the fuel injectors 11 to 14, the fuel injection fluctuation amount $\Delta Q(i)$ against the fuel injection amount Q(i) is acquired, and based on the acquired fuel injection fluctuation amount $\Delta Q(i)$, each of the correction parameters K(1) to K(4) is set. For example, by setting each of the correction parameters K(1) to K(4) such that "K(i)←K(i)×1/$\Delta Q(i)$" is satisfied, in a case in which the fuel injection fluctuation amount $\Delta Q(i)$ is more than "1", namely in a case in which the fuel injection amount Q(i) is fluctuated in a range at a larger side, the correction parameter K(i) is corrected to be smaller. Further, in a case in which the fuel injection fluctuation amount $\Delta Q(i)$ is less than "1", namely in a case in which the fuel injection amount Q(i) is fluctuated in a range at a smaller side, the correction parameter K(i) is corrected to be larger. Thus, the correction parameter K(i) can be calculated such that the fuel injection amount Q(i) is to be closer to the average value.

After the processing of Step S4, the ECU 30 calculates each of the fuel injection amounts Q(1) to Q(4) of the fuel injectors 11 to 14 by multiplying the basic fuel injection amount Qb by the each of the correction parameters K(1) to K(4) (Step S5). The ECU 30 executes the fuel injection control of each of the fuel injectors 11 to 14 based on the calculated fuel injection amounts Q(1) to Q(4) (Step S6).

According to the ECU 30 of the present embodiment described above, the following functions and effects of (1) to (4) described below can be obtained.

(1) The ECU 30 disallows the learning of the injection characteristic based on the fuel pressure P detected within the fuel injection period of each of the fuel injectors 11 to 14. With this, since the learning of the injection characteristic based on inappropriate fuel pressure drop amount is hardly performed, the learning of the injection characteristic of the fuel injectors 11 to 14 can be executed with high accuracy.

(2) In a case in which the fuel pressure P is detected within the time period between the first fuel injection start timing Tqs1 and the timing of "Tqe1+α1" in which the first fuel injection finish timing Tqe1 is added by a predetermined time α1, the ECU 30 determines that the detection timing of the fuel pressure P is within the fuel injection period of the predetermined fuel injector. Further, also in a case in which the fuel pressure P is detected within the time period between the second fuel injection start timing Tqs2 and the timing of "Tqe2+α2" in which the second fuel injection finish timing Tqe2 is added by a predetermined time α2, the ECU 30 determines that the detection timing of the fuel pressure P is within the fuel injection period of the predetermined fuel injector. With this, since the fuel pressure P detected during the transient fluctuation period of the fuel pressure P after the fuel injection can be excluded, the fuel pressure drop amount $\Delta P(i)$ in accordance with the fuel injection can be detected with high accuracy.

(3) In a case in which the first fuel injection in the divided injection is performed by the predetermined fuel injector within the time period between the detection timing of the preceding fuel pressure $P_{m-1}$ and the detection timing of the present fuel pressure $P_m$, the ECU 30 learns the fuel injection fluctuation amount $\Delta Q(i)$ by associating with the first fuel injection amount $Q1(i)$. With this, the fuel injection fluctuation amount $\Delta Q(i)$ can be learned appropriately.

(4) In a case in which both of the first fuel injection and the second fuel injection in the divided injection are performed by the predetermined fuel injector within the time period between the detection timing of the preceding fuel pressure $P_{m-1}$ and the detection timing of the present fuel pressure $P_m$, the ECU 30 learns the fuel injection fluctuation amount $\Delta Q(i)$ by associating with the average value $Q_{ave}$ of the first fuel injection amount $Q1(i)$ and the second fuel injection amount $Q2(i)$. With this, the fuel injection fluctuation amount $\Delta Q(i)$ can be learned appropriately.

Further, the present embodiment described above may be performed by the following configurations.

A number of injections or each timing of injections in the divided injection of the fuel injectors 11 to 14 may be modified as needed. For example, the number of injections in the divided injection of the fuel injectors 11 to 14 may be set more than three. In this case, in a case in which a plurality of fuel injections based on the divided injection is performed by the predetermined fuel injector within the time period between the detection timing of the preceding fuel pressure $P_{m-1}$ and the detection timing of the present fuel pressure $P_m$, the fuel injection fluctuation amount $\Delta Q(i)$ may be learned by associating with the average value $Q_{ave}$ of the fuel injection amounts of the plurality of the fuel injections.

The internal combustion engine 10 is not limited to a configuration having four fuel injectors and, for example, the internal combustion engine 10 may have six fuel injectors.

The present disclosure is not limited to the specific example described above. In other words, a configuration in which a design modification is added to the specific example described above by a person skilled in the art as needed may be included in the scope of the present disclosure as long as it has a feature of the present disclosure. For example, each component, arrangement, condition or the like provided in each specific example described above is not limited to those described as an example and may be modified as needed. Further, the components provided in the embodiment described above may be combined with each other as long as it is technically possible, and a configuration having the combined component may be included in the scope of the present disclosure as long as it has a feature of the present disclosure.

The invention claimed is:
1. A fuel injection control device for an internal combustion engine having a plurality of cylinders and a plurality of fuel injectors, the fuel injectors performing a divided injection to the cylinders, respectively, the fuel injection control device comprising:
- an accumulator that supplies accumulated fuel to each of the plurality of fuel injectors;
- a fuel pressure sensor that detects a fuel pressure inside of the accumulator, and
- an electronic control unit that receives a first fuel pressure at a first timing and a second fuel pressure at a second timing which are detected by the fuel pressure sensor at regular time intervals, wherein:
- the electronic control unit calculates a drop amount between the first fuel pressure and the second fuel pressure;
- the electronic control unit acquires a fluctuation amount of a fuel injection amount between each of the fuel injectors from the drop amount and learns an injection characteristic of each of the fuel injectors, the injection characteristic indicating a correlation between the fuel injection amount and the fluctuation amount;
- the electronic control unit calculates a correction parameter for correcting the fuel injection amount of each of the fuel injectors based on the injection characteristic of each of the fuel injectors;
- the electronic control unit disallows a learning of the injection characteristic which is based on the first fuel pressure and the second fuel pressure when at least one of the first fuel pressure and the second fuel pressure is detected during a fuel injection period of one of the plurality of fuel injectors, and when the fluctuation amount of the fuel injection amount is calculated based on the drop amount, the electronic control unit changes the fuel injection amount which will be associated with the fluctuation amount of the fuel injection amount, based on a number of the fuel injections performed by the predetermined fuel injector during a time period between the first timing and the second timing.

2. The fuel injection control device for an internal combustion engine according to claim 1, wherein
the electronic control unit disallows the learning of the injection characteristic during a period which includes the fuel injection period and a predetermined time.

3. The fuel injection control device for an internal combustion engine according to claim 1, wherein
the electronic control unit learns the fluctuation amount of the fuel injection by associating with the fuel injection amount in the fuel injection, when one of the fuel injections in the divided injection is performed by the predetermined fuel injector during the time period between the first timing and the second timing.

4. The fuel injection control device for an internal combustion engine according to claim 1, wherein
the electronic control unit learns the fluctuation amount of the fuel injection by associating with an average value of the fuel injection amount in the plurality of the fuel injections, when a plurality of the fuel injections in the divided injection is performed by the predetermined fuel injector during the time period between the first timing and the second timing.

* * * * *